United States Patent [19]

Schwab et al.

[11] Patent Number: 5,076,030
[45] Date of Patent: Dec. 31, 1991

[54] ALIGNMENT PLUG STRUCTURE

[76] Inventors: Albert J. Schwab, 3076 N. Lexington Ave., Roseville, Minn. 55113; Russell L. Carlson, 2207 Kohoma Cho Room 306, Mihara - shi, Hiroshima, Japan

[21] Appl. No.: 620,218
[22] Filed: Nov. 30, 1990
[51] Int. Cl.5 .............................................. E04F 19/00
[52] U.S. Cl. ...................................................... 52/20
[58] Field of Search ....................... 52/20, 101; 33/293

[56] References Cited

U.S. PATENT DOCUMENTS

| | | | |
|---|---|---|---|
| 1,660,833 | 2/1928 | Cronjaeger | 33/293 |
| 3,911,635 | 10/1975 | Traupe | 52/20 |
| 4,075,796 | 2/1978 | Cuozzo | 52/20 |
| 4,461,597 | 7/1984 | Laurin | 52/20 |
| 4,896,705 | 1/1990 | Podgers et al. | 52/20 |
| 4,925,337 | 5/1990 | Spiess et al. | 52/20 |

FOREIGN PATENT DOCUMENTS 2134575 8/1984 United Kingdom .................... 52/20

Primary Examiner—Richard E. Chilcot, Jr.
Assistant Examiner—Wynn Wood
Attorney, Agent, or Firm—Leo Gregory

[57] ABSTRACT

An alignment plug recessed into a concrete floor to be level with the floor surface having a removable cap to uncover permanent reference lines for aligning machinery.

8 Claims, 2 Drawing Sheets

ALIGNMENT PLUG STRUCTURE

BACKGROUND OF THE INVENTION

1. Field Of Invention

This invention relates to establishing reference lines for the alignment of machinery.

2. Brief Description Of The Previous Art

The present practice appears to consist of grouting a cylindrical bar into a concrete floor to have the end or the face of the bar co-planar with the floor and then manually scribing a center line thereon and this is repeated at intervals to have them coextensive with the machinery to be installed. Paper forming machinery may be several blocks long. A transit is used based on the scribed center lines.

The scribing is not always accurately done and in time becomes obliterated from traffic passing thereover. Hence such lines are not permanent reference lines which makes difficult future alignment of additional or replacement machines.

It is desirable to have accurate and permanently established reference lines.

SUMMARY OF THE INVENTION

It is the purpose of this invention to provide significant improvement in establishing permanent reference lines for the alignment of machinery as in a factory or mill area such as in a paper making mill.

A cylindrical metal plug such as a stainless steel plug is recessed to be floor level and grouted in position. The plug is brought to floor level by an adjusting cap screw thereunder.

The plug has a counter bore into which a protecting cap is threaded, underlying the cap and disposed into a bore thereunder is a spring loaded cylindrical face plate having a reference groove thereacross as a permanent reference line. The face plate is adapted to be urged upwardly to be co-planar with the upper surface of said plug when said protecting cap is removed.

In this manner a permanent reference line is provided. Said plugs will be as many in number as may be required to provide reference points for proper positioning of units of machinery.

DESCRIPTION OF A PREFERRED EMBODIMENT

Figure 1:
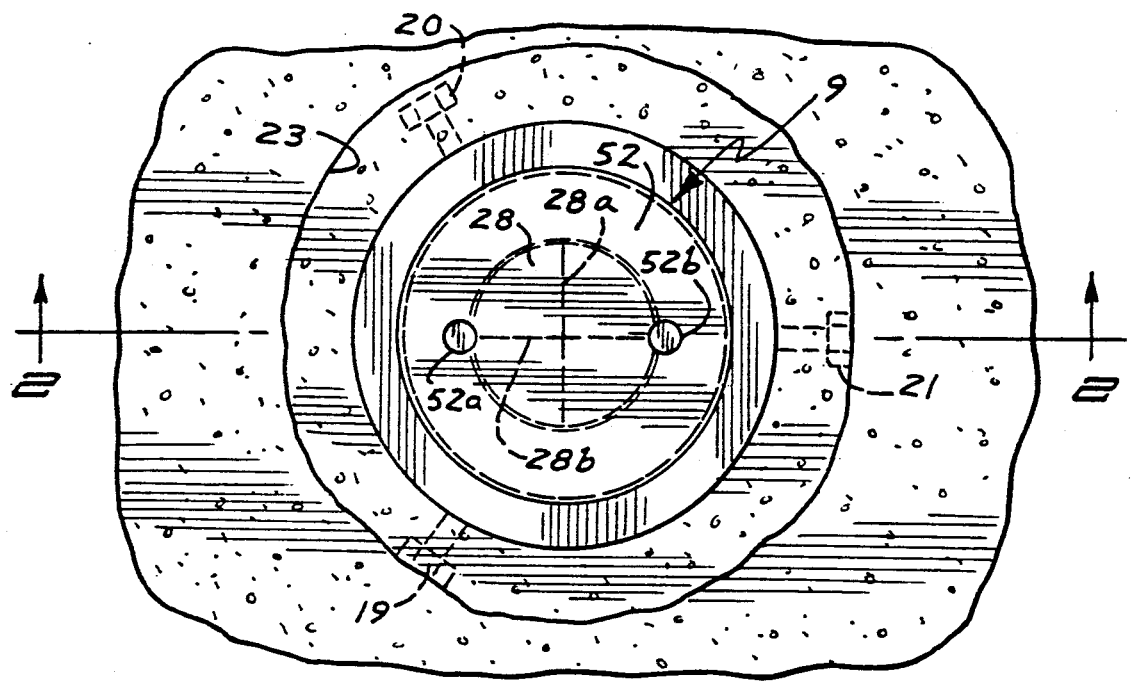
FIG. 1 is a top plan view of the device comprising the invention herein with the device in inoperative position.
Figure 2:
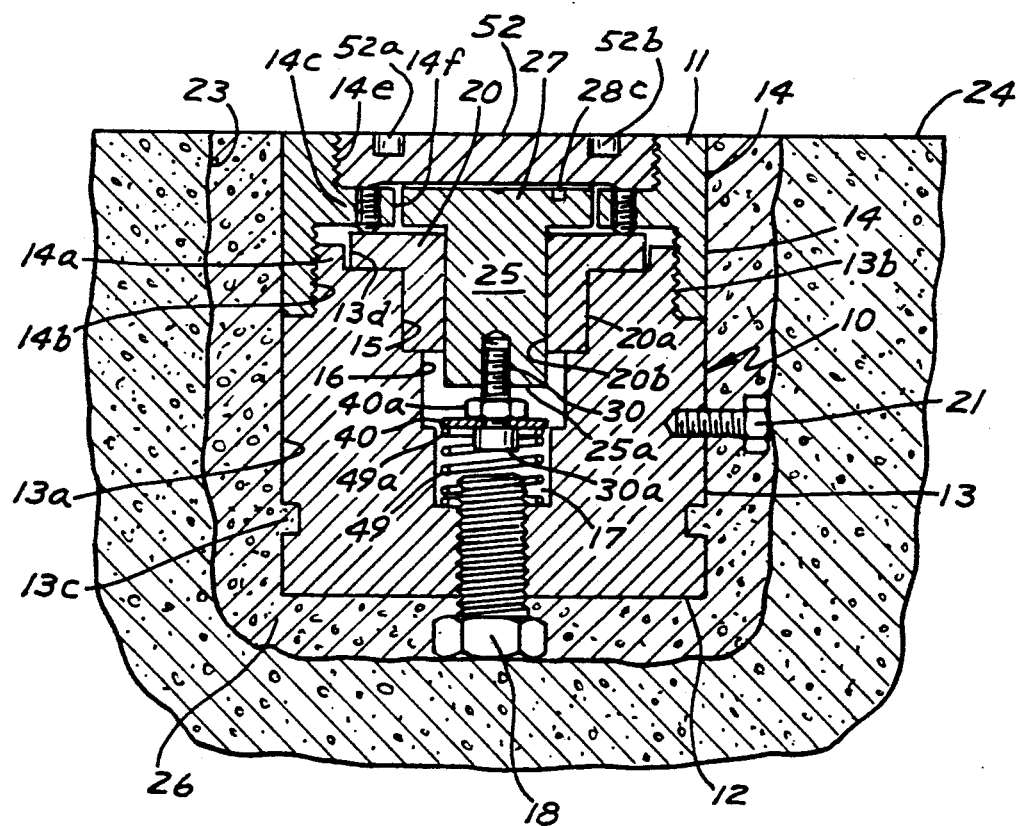
FIG. 2 is a view in vertical section taken on line 2—2 of FIG. 1 as indicated.

Referring to the Figs., in FIG. 1, a top plan view of a cylindrical plug 9 is shown and in FIG. 2, a view is given in vertical section showing the various parts thereof in their inter-relating arrangement.

Said plug comprises a housing 10 having a top wall 11 and a bottom wall 12. Said housing has a lower portion 13 having a side wall 13a and an upper portion 14 having a bottom recess or well 14a having a threaded inner side wall 14b.

Said housing portion 13 has an upwardly projecting threaded shoulder 13b of a reduced diameter and the same is threaded into said well 14a.

An annular groove 13c is formed about said lower housing portion adjacent its bottom. An adjusting elevating screw 18 is threaded into and through said bottom wall 12 and centering screws 19-21 are threaded into said lower housing portion spaced thereabout.

A hole 23 is bored into the flooring 24 at an operating site. A factory floor is generally concrete. The hole is of a depth and width to receive said plug. A practical size for said plug is on the order of three to four inches in height and on the order of three inches in diameter. When the plug is placed into said hole, the bottom screw will be adjusted to have the top wall 11 of said plug co-planar or flush with the surface of said floor 24 and the screws 19-21 will be adjusted to center the plug in an erect position. Grout 25 is poured into the hole about said plug to permanently fix the same in an operating position.

Referring now to the plug, said upper and lower housing portions 13 and 14 of said plug are separable.

Said upward projection 13b has formed in the top portion thereof a shallow recess 13d. Extending downwardly from said recess is a bore 15 which in turn has therebelow in descending order bores 16 and 17 with respectively reduced diameters. Said screw 18 extends into said bore 17.

Seated within said recess 13d is a plate member 20 having a depending hub 20a which seats within said bore 15. Said plate member 20 and its hub 20a have an axial bore 20b which is non-round in cross section and is here shown to be rectangular in cross section.

Slidably disposed within said bore 20b is a post 25 having a cross section corresponding to that of said bore 20b and having integral therewith formed as its top a circular plate member 27, said post and plate member preferably being formed of brass.

Diametrically across the upper face or surface portion 28 of said plate member 27 and cut thereinto for permanence are a pair of reference or sighting lines 28a and 28b, the same being at right angles to one another.

A small recess 28c is formed into said face portion 28 into which a convenient tool 29 such as an Allen wrench may be inserted for convenient rotation of said plate member 27 to position said reference lines.

An adjusting screw 30 having a head 30a is threaded into the bottom 25a of the post 25 having a washer 40 seated on its head and secured by a nut 40a. Said washer is of diameter to prevent the post 25 from being withdrawn through the bore 20b of said hub 20a.

Disposed into the lowermost bore 17 and seated therein is a coil spring 49 of a length to be indicated and said washer 40 seats upon the top coil 49a of said spring.

Said upper housing portion 14 has an annular shoulder 14c overlying said recess 14a and overlying said shoulder is an upper recess 14d having a threaded side wall 14e. Extending through said shoulder centrally thereof is a bore 14f, the same having a diameter to permit said plate member 27 to pass therethrough.

Tapped into said shoulder diametrically opposed are a pair of Allen set screws 50 and 51, the use of which will be described.

When the plug 10 is assembled with the upper portion 14 threaded onto the lower portion 13, the coil spring 49, its length being appropriate, will be under such compression as to urge the plate member 27 upwardly to have its surface co-planar with the top wall 11.

Figure 3:
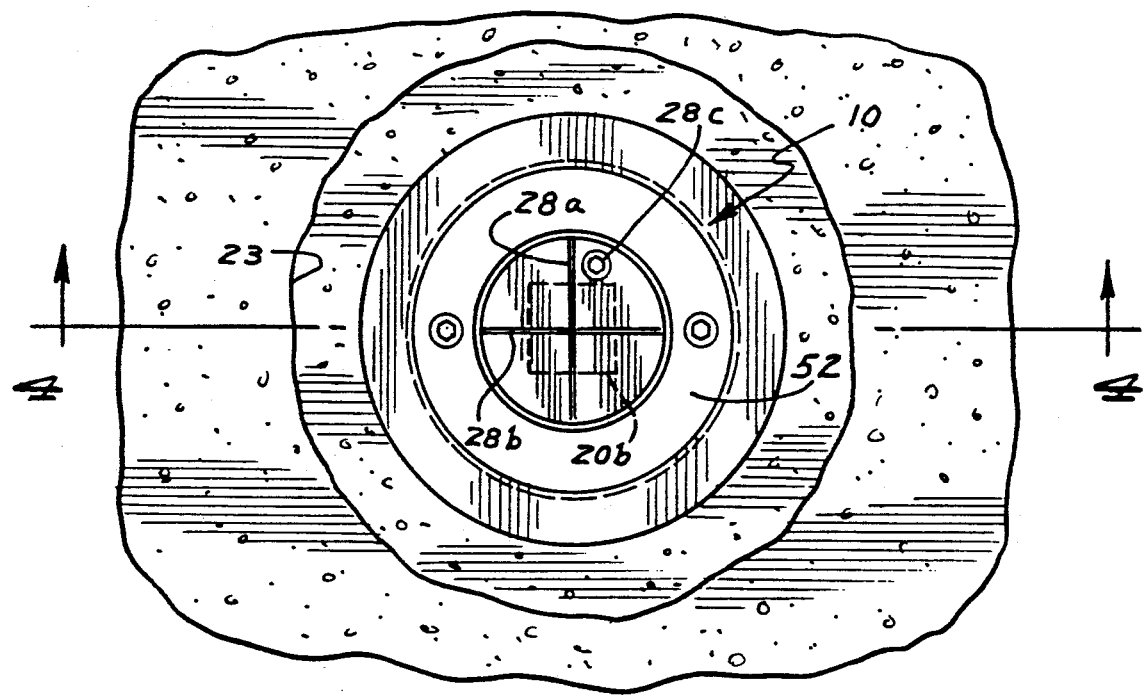
FIG. 3 is a top plan view of the device in operating position.
Figure 4:
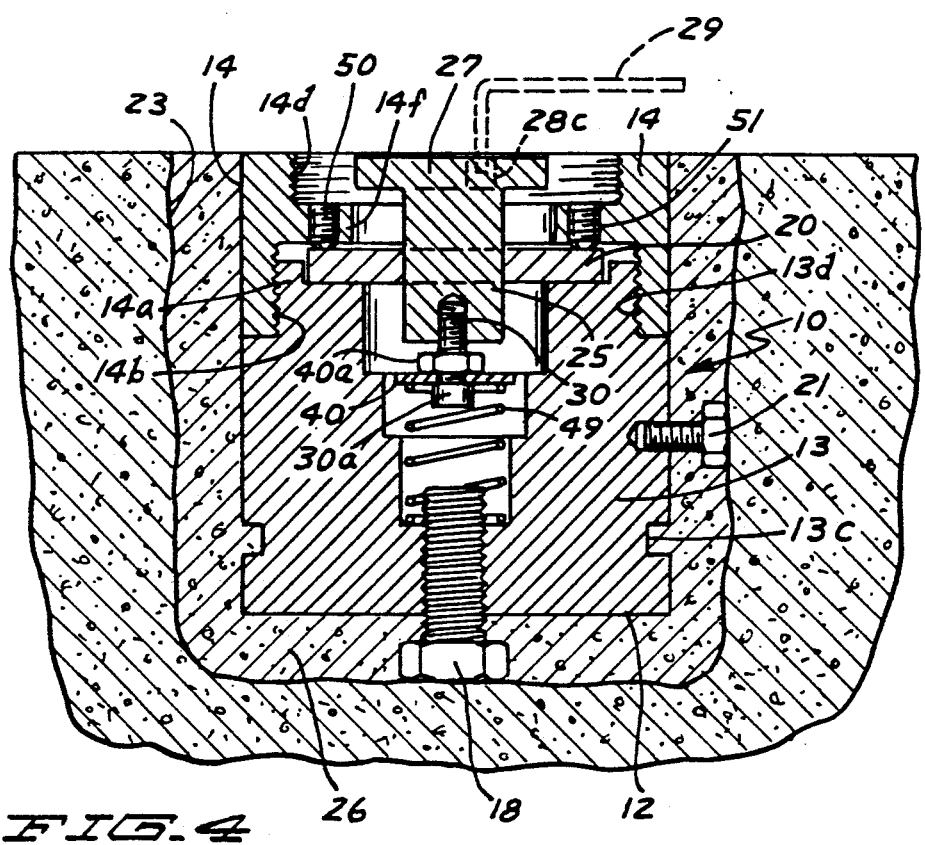
FIG. 4 is a view in vertical section taken on line 4—4 of FIG. 2 as indicated.

Reference is now had to the Allen set screws 50 and 51. Said plate member 20 has disposed therethrough the post 25 which has at its top the plate member 27 bearing the reference or sighting lines 28a and 28b. Said plate member 27 and said post 25 are integral and non-rotative relative to each other and can rotate only with rotation of the plate member 20. Said plate member underlies the shoulder 14. When the sighting lines are correctly positioned, the Allen set screws are screwed down to then engage the plate member 20 and prohibit its relative movement. Thus the reference or sighting lines are readily locked into a desired sighting position to provide a proper alignment guide for positioning machinery. See FIG. 3.

Said upper recess 14d, when said plug is out of use, will have threaded thereinto a brass circular cover plate 52 which when threaded into said upper recess forces the face plate 27 downwardly against the compression of the spring 49. Said cover plate 52 has a pair of opposed detents 52a and 52b therein to permit the use of a Spanner wrench to rotate said plate and close said recess. Said plate will be threaded down to be co-planar with the surrounding flooring.

Thus it is seen that the reference lines initially established for the initial placement of machinery are preserved for future use when replacement of segments of machinery becomes necessary. One industry where accurate placement of machine fragments is essential is in the paper making industry wherein machine segments may require correct alignment over a distance of two or three blocks and exact alignment is essential to producing a suitable product.

It will of course be understood that various changes may be made in form, details, arrangment and proportions of the product without departing from the scope of the invention which, generally stated, consists in a product capable of carrying out the objects above set forth in the parts and combination of parts disclosed and defined in the appended claims.

What is claimed is:

1. An alignment plug comprising,
a housing having a top wall and a bottom wall,
said housing adapted to be anchored in a floor opening having its top wall co-planar therewith,
an upper portion of said housing having an internally threaded recess therein,
a plate member bearing reference lines thereon being disposed in said recess,
compressible means underlying said plate member urging said plate member to be co-planar with said floor opening,
a cover plate disposable into said recess submerging said face plate thereunder in a storage position.

2. An alignment plug comprising,
a housing having top and bottom walls,
said housing having separable upper and lower portions,
said lower portion having an upwardly projecting threaded portion,
said projecting portion having a shallow recess therein,
a plurality of descending bores of respectively reduced diameters extending downwardly from said recess,
a plate member seated within said recess,
a depending hub from said plate member disposed into the adjacent bore extending downwardly from said recess,
an axial bore non-round in cross section extending through said plate member and its depending hub,
a plate member bearing reference lines resting upon said last mentioned plate member and having a depending hub corresponding in cross section to said axial bore,
means carried by said hub preventing its withdrawal from said bore,
a coil spring seated in the lowermost of said bores extending upwardly to engage said hub,
said upper portion having an axial bore therethrough to permit passage therethrough of said second mentioned plate member,
said coil spring positioning said second mentioned plate member upwardly to be co-planar with the top wall of said upper portion,
said upper portion having a shallow internally threaded recess in its upper end portion, and
a cover plate adapted to be threaded into said last mentioned recess depressing said second mentioned plate member against the compression of said coil spring to become co-planar with the top wall of said upper portion.

3. The structure of claim 1, including
an annular groove about said housing adjacent the bottom wall thereof.

4. The structure of claim 1, wherein
said reference lines consist of a pair of diametrical lines cut into said face plate at right angles to one another.

5. The structure of claim 2, wherein
said recess in said upper end of said upper portion having an annular bottom wall,
at least one set screw threaded into and through said annular bottom wall engaging said plate member in said shallow underlying bore locking the same against relative movement.

6. The structure of claim 1, wherein
said cover plate is adapted to be rotated into position by an appropriate tool.

7. The structure of claim 1, including
a height adjustment screw threaded into said bottom wall.

8. The structure of claim 1, including
lateral centering screws spaced about and threaded into said housing.

* * * * *